Sept. 1, 1936.  A. O. FLINDT  2,053,142
TEMPERATURE REGULATING SYSTEM FOR VAPOR ELECTRIC DEVICES
Filed March 26, 1935  2 Sheets-Sheet 1
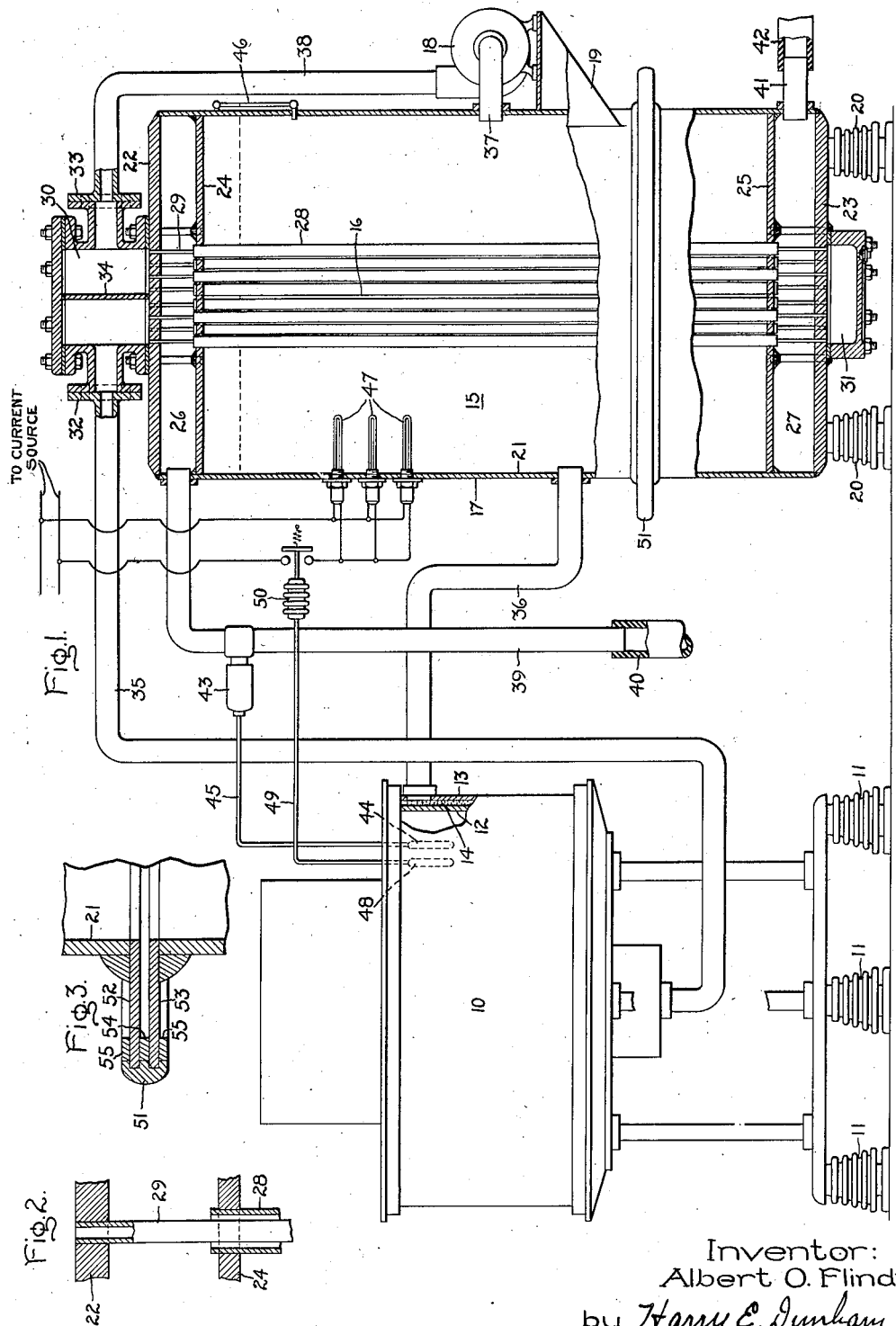
Inventor:
Albert O. Flindt,
by Harry E. Dunham
His Attorney.

Sept. 1, 1936. A. O. FLINDT 2,053,142
TEMPERATURE REGULATING SYSTEM FOR VAPOR ELECTRIC DEVICES
Filed March 26, 1935 2 Sheets-Sheet 2
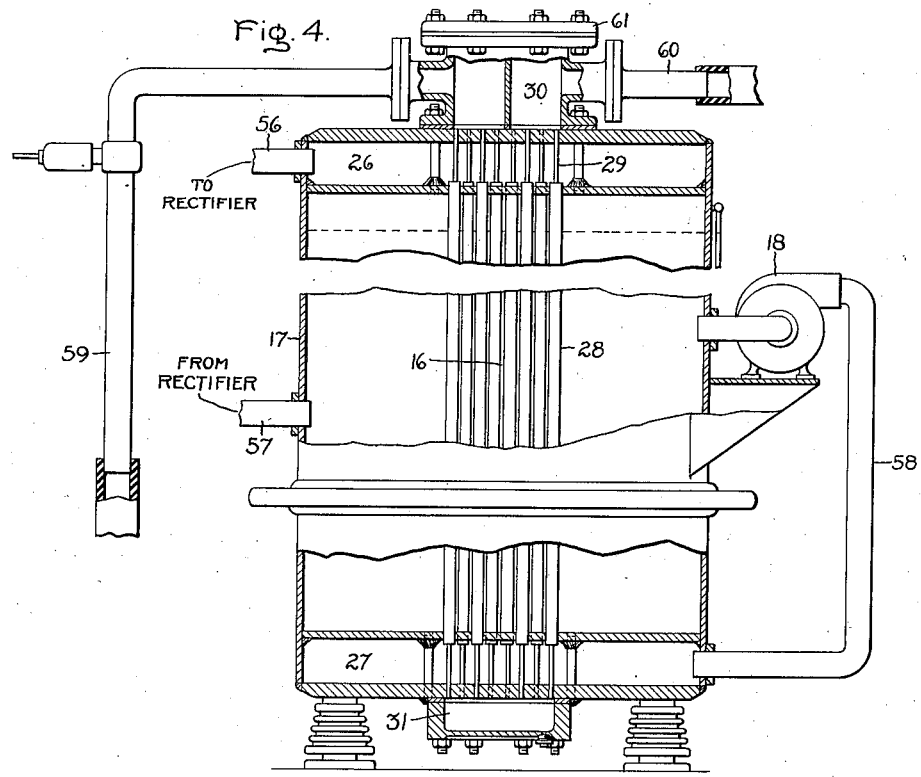
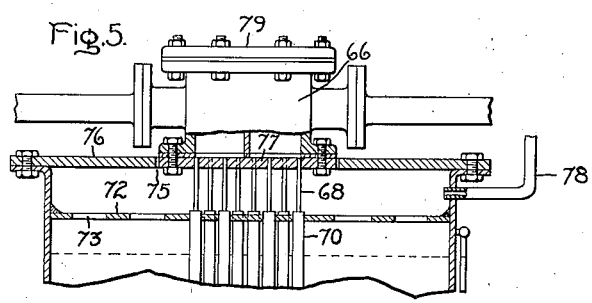
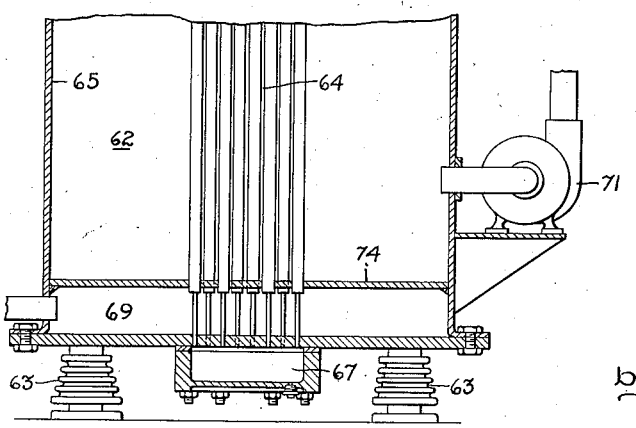
Inventor:
Albert O. Flindt,
by Harry E. Dunham
His Attorney.

Patented Sept. 1, 1936

2,053,142

UNITED STATES PATENT OFFICE 2,053,142

TEMPERATURE REGULATING SYSTEM FOR VAPOR ELECTRIC DEVICES

Albert O. Flindt, Scotia, N. Y., assignor to General Electric Company, a corporation of New York Application March 26, 1935, Serial No. 13,023

10 Claims. (Cl. 250—27.5)

My invention relates to temperature regulating systems for vapor electric devices such as mercury arc rectifiers or inverters of the iron tank type, particularly to temperature regulating systems employing a closed circulation system including a rectifier, a heat exchanger, a pump, and a storage and expansion tank or reservoir, and its general object is the provision of a temperature regulating system of this character which operates with increased efficiency and is of compact and simplified construction.

It is usual practice in the operation of a vapor electric device such as a rectifier or inverter of the iron tank type to cool or otherwise to modify the temperature of the water or other medium used in removing the excess heat taken out of the rectifier tank, or used in controlling the temperature conditions within the rectifier tank, by means of a closed circuit circulation system in which water or other suitable temperature regulating medium is caused to flow. The heat absorbed from the rectifier tank by this circulating medium is removed by cooling medium which is supplied from any suitable source, as from a city water main, and which flows in an open circulation system through one side of the heat exchanger.

Difficulties are encountered in the use of a temperature regulating system of the above described character in certain localities where space limitations are such that the space occupied by the equipment is required to be restricted as much as possible. In accordance with the present invention I have overcome the above and other difficulties in the use of a system of this character in a restricted space by the provision of a combined heat exchanger and storage and expansion tank or reservoir. In the use of a temperature regulating system characterized by this feature of my invention the space required in a congested rectifier substation for example is materially reduced over that required in usual practice, since the outer shell of the heat exchanger is eliminated, the heat exchanger, which is preferably of the concentric tube type, being mounted inside the storage tank or reservoir.

It is a further feature of my invention that the pump required to maintain the flow of temperature controlling medium in the above-mentioned closed circulation system is mounted on the combined heat exchanger and storage tank. In usual iron tank rectifier installations the rectifier is insulated from ground. The mounting of the pump on the storage tank permits of easily insulating the tank from ground, thereby permitting that portion of the closed circulation system which is constituted by the heat exchanger, the storage tank enclosing the heat exchanger, the pump and the pipe connections between the storage tank and the rectifier, to operate at the same potential as the rectifier. It is then only necessary, in order to maintain the whole system insulated from ground, to provide insulating means such as rubber hose in the pipe connections leading from the cooling medium source and from the discharge outlet of the cooling medium side of the heat exchanger.

It is a further feature of my invention that the immersion heaters, necessary for maintaining the rectifier at proper operating temperature during cold weather, are mounted within the above-described combined heat exchanger and storage tank unit instead of in some portion of the rectifier itself. The temperature controlling system in accordance with my invention thereby becomes not only an instrumentality for cooling the rectifier during operation at normal or other load when heat losses must be carried away from the rectifier, but also for supplying heat to the rectifier when such supplying of heat is necessary to permit the rectifier to operate under large load increases, without arc back, after a period of low load and very low ambient air temperature has tended to cause the rectifier temperature to drop to a value below the optimum operating temperature.

In one form of my invention the closed circulation system is so arranged that the water or other temperature controlling medium used in this closed system flows through the means such as the water jacket of the rectifier providing a path or chamber for the medium, thence through the storage tank or reservoir, the pump, and the inner set of the concentric tubes of the heat exchanger, the water or other cooling medium used in the other, or open, circulation system and taken from a supply source such as city mains, being at the same time arranged to flow through the outer set of the concentric tubes. In this form of the invention, double cooling action is obtained directly from the cold water or other cooling medium which flows in the open circulation system from the supply source. As this cooling medium flows in the annular spaces between the inner and outer tubes, the cooling medium not only removes heat from the cores of high velocity hot water inside the small inner set of tubes but also removes heat from the body of hot water in the reservoir in which the concentric tubes comprised in the heat exchanger are immersed, the medium in the reservoir being in contact with the outside surface of the outer set of concentric tubes.

In order to compensate for unequal expansion of the reservoir and the tubes of the heat exchanger mounted therein, a means such as an expansion joint in the walls of the reservoir is preferably provided.

In a modification of my invention the parts of the closed circulation system are essentially the same as in the first form above described. In the modification, however, the path for the flow of temperature regulating medium in the closed circulation system includes the outer set of the concentric tubes of the heat exchanger instead of the inner set, and in the other, or open, circulation system the water or cooling medium from the supply source flows through the inner set of the concentric tubes. This form of the invention has the advantage that, by suitable construction, the inner set of tubes may be made readily accessible and thereby impurities or deposits from the city water or other cooling medium which flows through the heat exchanger may be readily removed periodically. The medium flowing in the annular spaces between the inner and outer spaces is of such character that this medium has negligible tendency to cause deposits to form in these annular passages which are part of the closed circulation system, the same medium being circulated indefinitely through these passages.

In a further modification of my invention, as in the above-described modification, the path for the temperature controlling medium in the closed circulation system includes the reservoir, the pump, the jacket or other medium conducting means of the rectifier, and the outer set of the concentric tubes of the heat exchanger. In the other, or open, circulation system the cooling medium such as water from the city mains flows through the inner set of the concentric tubes. However, in this further modification the medium in the reservoir is at atmospheric pressure, the medium in the rest of the closed circulation system being under pressure from the pump. In this further modification the expansion joint in the walls of the reservoir is dispensed with, the unequal expansion of tubes and other parts of the combined heat exchanger and storage tank or reservoir being provided for by a sliding joint between the removable cover of the reservoir and the tube sheet into which the upper ends of the inner set of concentric tubes are expanded. In this way access to the interior of the reservoir can be obtained by removing the top cover flange bolts.

My invention will be better understood from the following description when considered in connection with the accompanying drawings and its scope will be pointed out in the appended claims.

Referring to the drawings, Fig. 1 is a semi-diagrammatic side-elevational view, partially in section, of a portion of a mercury arc rectifier installation comprising a combined heat exchanger and storage tank, in which my invention has been embodied; Fig. 2 is an enlarged view illustrating the arrangement of the inner and outer sets of concentric tubes in the combined heat exchanger and storage tank shown in Fig. 1; Fig. 3 is an enlarged view of a portion of an accordion type expansion joint with which the combined heat exchanger and storage tank shown in Fig. 1 is provided; Fig. 4 illustrates a modification of my invention similar to that shown in Fig. 1 but in which cooling water from the supply source flows through the inner set of the heat exchanger tubes; and Fig. 5 illustrates a modification of my invention in which the temperature controlling medium in the storage tank or reservoir of the combined heat exchanger and storage tank or reservoir is at atmospheric pressure.

In Fig. 1 the numeral 10 indicates a vapor electric device such as an iron tank mercury arc rectifier insulated from ground as by mounting on insulators 11, and having an evacuated tank portion 12. The rectifier 10 is shown on a scale which is considerably reduced with reference to other parts of the system, in order to economize space in the drawings. The electrical details of construction of the rectifier 10 may be of any usual form, as also the associated transformers and the connections to supply lines or other networks. As these electrical details form no part of the present invention they will not be further described herein. The rectifier 10 is provided with suitable means for conducting a temperature controlling medium for the transfer of heat to or from the vapor within the evacuated tank 12, the tank having, for example, a usual jacket 13 providing a path or chamber for the flow of the temperature controlling medium 14 which is preferably a solution of a corrosion inhibiting material in water. The path or chamber forms part of a closed circulation system which will be described more fully hereinafter.

The numeral 15 indicates a combined water exchanger and storage tank or reservoir formed as above described by the mounting of the heat exchanger, indicated by the numeral 16 within the storage tank or reservoir indicated by the numeral 17. A pump 18 for circulating the corrosion inhibiting solution is provided, preferably mounted directly on the wall of the storage tank 17, as by a bracket 19, thereby permitting the storage tank to be easily insulated from ground by insulators 20, the piping connections between the rectifier 10 and the combined heat exchanger and storage tank 15 being thus simplified by reason of the fact that the latter two elements may operate at the same potential.

In the combined heat exchanger and storage tank 15, the storage tank or reservoir 17 comprises a cylindrical wall or casing 21, cover plate 22, bottom plate 23, and tube sheets 24 and 25 spaced respectively from the plates 22 and 23 to form circular chambers 26 and 27 for a purpose to be explained hereinafter. The heat exchanger portion of the combined heat exchanger and storage tank is preferably of the concentric tube type comprising two sets of tubes, the tubes of one set being arranged concentrically with respect to the tubes of the other set. The outer tubes 28 of the concentrically arranged sets of tubes extend between the upper and lower tube sheets 24 and 25, the ends of tubes 28 being connected to these tube sheets preferably by being expanded into holes formed in the sheets as indicated more clearly in Fig. 2. The inner tubes 29 extend between the cover plate 22 and bottom plate 23 of the reservoir, these latter plates being utilized as tube sheets into which the ends of the tubes 29 are expanded.

The inner set of tubes 29 open at their upper and lower ends into water boxes 30 and 31, fastened respectively to the cover plate 22 and the bottom plate 23 of the storage tank. To provide means of entrance and exit so that water or other medium may be caused to flow through the inner set of tubes 29, one of the water boxes, preferably the upper box 30, is fitted with connections 32 and 33. One or more partitions or baffles as 34 may be provided in the water boxes 30, 31 to cause the water to make two or more passes through the inner tubes 29 as may be required to maintain a suitable water velocity to obtain high heat transfer. The number of tubes used may also be varied so as to obtain suitable water velocity and high heat transfer consistent with other conditions entering into the design.

The pipe connections for the closed circulation system comprises a pipe 35 between the connection 32 of water box 30 and a lower point of the rectifier 10, a pipe 36 between an upper point of the rectifier 10 and preferably a lower point of the storage tank 17, a pipe 37 between a point at a desired level of the storage tank and the pump 18, and a pipe 38 between the pump and the connection 33 of the water box 30. The pipe connections for the other, or open, circulation system comprise a pipe 39 insulated from ground as by a rubber hose or other nonconductor section 40 and connected between any suitable source of cooling medium, such as a city water main, and the water chamber 26 into which open the upper ends of the outer set of tubes 28. The pipe connections for the open circulation system further comprise a pipe 41, likewise insulated by a rubber hose, or suitable nonconductor section 42. Pipe 41 is connected to the water chamber 27, into which open the lower ends of outer tubes 28, and is arranged to discharge to any convenient sewer or other outlet. A temperature regulating valve 43 which is responsive, by means of a bulb 44 and connecting tube 45, to the temperature of the medium 14 in the chamber formed between jacket 13 and tank wall 12 of the rectifier 10, is preferably provided in the inlet pipe 39 for the cooling medium in the open circulation system. This valve limits the quantity of cooling medium admitted to the heat exchanger to the minimum required to take care of the degree of cooling necessitated by load conditions on the rectifier.

From the foregoing description of the apparatus illustrated in Fig. 1 it will be seen that the closed system for the circulation of the corrosion inhibiting medium 14 which transfers heat to or from the vapor and operating members within rectifier 10 comprises that portion of the rectifier in which the medium flows, the space within storage tank 17 outside the heat exchanger tubes and up to the level indicated by the water gauge 46, the pump 18, and the inner tubes 29 of the concentric tube type heat exchanger 16. Further, it will be seen that the other, or open, circulation system comprises a source of cooling medium (not shown) such as a city water main, the upper chamber 26 of the combined heat exchanger and storage tank, the outer tubes 28 of the concentric tube type heat exchanger, the lower chamber 27, and a discharge or outlet means for the lower chamber 27.

The numeral 47 indicates a plurality of immersion heater elements which instead of being mounted, as in usual practice, in the space in rectifier 10 in which the temperature regulating medium flows, are mounted within the combined heat exchanger and storage tank 15 and in contact with the medium contained in the storage tank 17. The heaters 47 are arranged to be connected, in multiple or in any other desired manner, to a source of heating current which is controlled in accordance with the temperature of the water or other temperature regulating medium in the rectifier 10 by means of a bulb 48 immersed in this medium, a connecting tube 49, and a relay means 50.

The numeral 51 designated an expansion joint placed in the casing 21 of the storage tank to compensate for unequal expansion of the tubes 28, 29 which are preferably of brass, and the storage tank 17 which is preferably of steel. The expansion joint may comprise, as shown more clearly in Fig. 3, a ring or rings 52 welded or otherwise fastened at the inner edge or edges to an upper section of tank wall 21, and a similar ring or rings 53 fastened to a lower section of wall 21, the rings 52 and 53 being spaced by a ring or rings 54 and backed up by a ring or rings 55, all of which are fastened together at their outer edges by a sealing weld.

In operation of the temperature controlling system embodied in the rectifier installation illustrated in Fig. 1, during periods of normal or other load operation when heat losses due to the flow of current in the rectifier 10 require to be removed therefrom in order to prevent rise of temperature therein above a desired value, the temperature controlling medium is circulated through the cooling spaces of the rectifier such as the cooling spaces between jacket 13 and tank wall 12, thereby absorbing heat from the electrically active portions of the rectifier. The medium thus heated passes into the storage tank portion 17 of the combined heat exchanger and storage tank 15, the quantity of medium 14 in the entire system being such that the medium in storage tank 17 fills the latter tank to a suitable height, leaving a vapor or air space in tank 17 for expansion of the medium. From the storage tank 17 the medium passes through the pump 18 which is operated by any suitable electric motor (not shown) and by manual or other control means (not shown) to maintain the flow of the medium as desired in the closed circulation system. From pump 18 the medium flows through the right hand section of water box 30, down through those tubes of the inner set 29 of the concentric tube type heat exchanger 16 which open into the upper water box 30 to the right of partition 34, thence into the lower water box 31, and upwardly through those tubes of the inner set of tubes 29 which open into the upper water box 30 to the left of partition 34; or the medium makes as many passes up and down as may be desired and caused by the number of partitions similar to 34 provided in water boxes 30 and 31.

From water box 30 the medium 14 returns to the rectifier 10 to be passed again through the water jacket or other means, forming part of the rectifier, for the flow of the temperature controlling medium.

It is obvious that the exact order hereinabove described in which the medium 14 flows through the rectifier, heat exchanger tubes 29, storage tank 17, and pump 18, is not essential. For example the pipe connections may be so arranged and the direction of flow of the medium 14 be such that the elements above enumerated of the closed circulation system may be arranged in the following order: pump 18, rectifier 10, tubes 29, and storage tank 17.

Since the cold water from the city main flows in the annular space between the inner set of tubes 29 and the outer set 28, a double cooling action is obtained in that heat is absorbed from the heated medium which is flowing at relatively high velocity through the inner set of tubes 29 and also from the body of heated medium in the storage tank 17 through which the outer tubes 28 pass.

Desired temperature conditions within rectifier 10 are maintained by means of the control means comprising the valve means 43 which regulates the amount of coolant flowing in the open circulation system, through the outer set of tubes 28 of the heat exchanger. The operation of this valve is controlled by the thermostatic means comprising the bulb 44 which is immersed in the medium 14 within the water jacket of the rectifier 10.

When it is required that the rectifier 10 operate under a relatively large load increase after the temperature within the rectifier has tended to drop due to a period of low load, or to very low ambient temperature, the heaters 47 ensure the required rectifier temperature. These heaters are arranged to be supplied with current controlled by the relay means 50 and the thermostatic means or bulb 48 which is responsive to the temperature of the medium 14 in rectifier 10. A decrease in the rectifier temperature, due to the above mentioned low load or other condition, below a predetermined value causes the heaters 47 to raise the temperature of the medium in tank 17 and thereby, by reason of the circulation of this medium by pump 18, to raise the temperature of the rectifier. At the same time the valve 43 which is also responsive to rectifier temperature, operates to reduce or to cut off the flow of cooling medium from the city main and thereby to permit increase of the rectifier temperature at a faster rate, up to the desired operating value.

Under all conditions of temperature encountered in the operation of the system, unequal expansion of the walls of the storage tank 17 and the heat exchanger tubes 28 and 29, which are rigidly fastened to the end plates or tube sheets of the tank 17, is provided for by the expansion joint 51 which permits slight bending of the plates 52 and 53 and consequent relative motion of the upper and lower sections of the tank wall 21.

Referring to the modification of my invention illustrated in Fig. 4, as compared with the form of the invention shown in Fig. 1, the medium in the closed circulation system in Fig. 4 circulates through the jacket, or other equivalent medium conducting portion of rectifier 10, the storage tank 17 and the pump 18, similarly to the system shown in Fig. 1. In Fig. 4, however, the path for the temperature controlling medium in the closed circulation system includes the outer set of tubes 28 of the heat exchanger 16 and the water chambers 26 and 27, instead of the inner set of tubes 29 and the water boxes 30 and 31. The open circulation system in Fig. 4 comprises, as in Fig. 1, a source of cooling medium (not shown) such as a city water main. But the rest of the open circulation system in Fig. 4 includes the inner set of tubes 29 and the water boxes 30 and 31, the water being caused to flow through one section of water box 30, down through one inner set of tubes 29, through the lower water box 31, and upwardly to water box 30 through the other set of the inner tubes 29. The pipe connections in the modification shown in Fig. 4 preferably include pipes 56 and 57 connecting the rectifier to the water chamber 26 and the storage tank 17, pipe 58 connecting pump 18 to water chamber 27, and pipes 59 and 60 connecting the water box 30 to the cooling water source and outlet. Since the inner set of tubes 29 of the heat exchanger are readily accessible for cleaning through a water box, as by the removal of cover 61 of water box 30, any deposits from the water flowing from the city main in the open circulation system may be easily removed.

The operation of the modification of my invention illustrated in Fig. 4 may be more clearly understood by reference to the hereinbefore described operation of the rectifier temperature controlling system illustrated in Fig. 1.

Referring to the modification of my invention illustrated in Fig. 5, this latter modification is in general similar to the forms shown in Figs. 1 and 4 in that the system of Fig. 5 comprises a combined heat exchanger and storage tank 62 insulated from ground by insulators 63 and including a heat exchanger portion 64, a storage tank portion 65, water boxes 66 and 67 into which open the inner set of tubes 68 of the heat exchanger, a lower water chamber 69 into which open the lower ends of the outer set of heat exchanger tubes 70, and a pump 71 mounted on the storage tank 65.

In the modification shown in Fig. 5, however, the upper ends of the outer set of heat exchanger tubes 70 open directly into the storage tank 65 instead of into an upper water chamber partitioned off from the main body of the tank by a tube sheet. In order to hold the upper ends of the outer tubes 70 in position a spacing means is provided, preferably in the form of a plate member 72 mounted in the tank 65 and having perforations through which the tubes 70 pass. The plate 72 may be of any desired shape, rectangular, for example, or circular and provided with openings as 73. Furthermore the plate 72 may be just large enough to extend over the tube bundle and hold the outer tubes 70 in alignment, and be supported by transverse structural members welded to the storage tank shell 65 at their ends.

The modification shown in Fig. 5 differs further from the forms of the invention shown in Figs. 1 and 4 in that no expansion joint is provided in the cylindrical walls of the storage tank 65. The outer tubes 70 of the heat exchanger are connected at their lower ends only to a tube sheet, 74, and are free to expand and contract longitudinally through the spacing plate 72. Therefore no special means such as the expansion joint 51 of Figs. 1 and 4 is required to compensate for unequal expansion of outer tubes 70 and the walls of storage tank 65. The inner tubes 68, however, open into and are rigidly connected to water boxes, 66 and 67, at both upper and lower ends, and a means to provide for the unequal expansion of the storage tank and the inner set of tubes 68 is therefore required. In the modification shown in Fig. 5 the means for this latter purpose comprises a sliding joint 75 formed between the cover plate 76 of storage tank 65 and the tube sheet 77 forming the lower part of the water box 66.

Further, in the modification shown in Fig. 5, the temperature controlling medium contained within the storage tank portion 65 of the combined heat exchanger and storage tank 62 is at atmospheric pressure. A vent pipe 78 is preferably provided establishing communication between the space in the upper portion of tank 65 and the outside atmosphere.

In operation of the system illustrated in Fig. 5, the temperature controlling medium in the closed circulation system flows from the rectifier to the water chamber 69 and thence upwardly in the outer set of heat exchanger tubes 70, in the same manner as indicated in connection with the modification shown in Fig. 4. In the modification of Fig. 5, however, the medium, instead of flowing from the outer tubes 70 into an upper water chamber, flows out of the open upper ends of the outer tubes 70 into the body of medium, at atmospheric pressure, in the storage tank 65. From the storage tank the medium is circulated, under pressure, by pump 71 through the rectifier, from which the medium returns to the water chamber 69. Therefore in the closed circulation system shown in Fig. 5 the temperature controlling medium in one part of its circuit, i. e., in storage tank 65, is at atmospheric pressure, and in the remainder of its circuit, i. e., in the rectifier, the water chamber 69, the outer set of heat exchanger tubes 70, the pump 71, and the pipe connections between rectifier and storage tank and between pump and rectifier, the medium is under pump pressure.

The open circulation system of Fig. 5, comprising the water boxes 66 and 67, the inner set of heat exchanger tubes 68 and the pipe connections to the water supply and outlet, operates in the same manner as described in connection with the modification shown in Fig. 4. Further, access to the inner set of tubes 68 for cleaning may be provided, as by the provision of a readily removable cover plate 79 for the water box 66.

The modifications of my invention illustrated in Figs. 4 and 5 are preferably provided with temperature controlled valve means associated with the open circulation system, and with temperature controlled heater means associated with the closed circulation system. These valve and heater means may be of the same construction and have the same mode of operation as set forth in connection with the form of the invention illustrated in Fig. 1.

My invention has been described herein in particular embodiments for purposes of illustration. It is to be understood, however, that the invention is susceptible of various changes and modifications, and that by the appended claims I intend to cover any such modifications as fall within the true spirit and scope of my invention.

What I claim as new and desire to secure by Letters Patent of the United States, is:

1. The combination with a vapor electric device comprising means for conducting a medium for the transfer of heat in said device, of means to control the temperature of the vapor in said device comprising a heat exchanger including two sets of tubes, the tubes of one of said sets being arranged respectively within the tubes of the other set, said heat exchanger being mounted within a reservoir for said medium, said medium in the reservoir being in contact with the outside set of the concentric tubes of the heat exchanger, a pump, said medium conducting means, said reservoir, one set of said tubes and said pump forming a closed system for the circulation of said medium, and means to circulate a temperature controlling medium through the other set of said concentric tubes.

2. In combination, a vapor electric device insulated from ground and comprising temperature controlling medium conducting means, a reservoir for said medium insulated from ground, a heat exchanger including two sets of tubes, the tubes of one of said sets being arranged respectively within the tubes of the other set, said heat exchanger being mounted within said reservoir, a pump mounted upon said reservoir, said medium conducting means, said reservoir, one set of said tubes and said pump forming a closed system for the circulation of said temperature controlling medium, and means insulated from ground to circulate a cooling medium through the other set of said tubes.

3. The combination with a vapor electric device comprising temperature controlling medium conducting means, of means to control the temperature of the vapor in said device comprising a reservoir for said medium, a heat exchanger including two sets of tubes, the tubes of one of said sets being arranged respectively within the tubes of the other set, said heat exchanger being mounted within said reservoir, a pump mounted upon said reservoir to circulate said medium in series through said medium conducting means and said reservoir and one set of said tubes, temperature controlling means responsive to the temperature of the medium in said conducting means mounted in contact with said medium in the reservoir, and means to circulate a cooling medium through the other set of said tubes.

4. In combination, a mercury arc device of the iron tank type having a jacket for temperature controlling medium, a combined heat exchanger and reservoir, said heat exchanger comprising two sets of tubes mounted within said reservoir, the tubes of one set being arranged respectively within the tubes of the other set, a closed circulating system for said medium comprising said jacket, the portion of said reservoir surrounding said tubes, one set of said tubes, and means to circulate said medium through said closed system, and a second circulating system comprising the other set of said tubes, means to supply a cooling medium to said other set of tubes, and means to discharge said last-named medium from said other set of tubes.

5. In combination, a vapor electric device comprising means providing a path for the flow of a temperature regulating medium, a reservoir for said medium, a heat exchanger including two sets of tubes, the tubes of one of said sets being arranged respectively within the tubes of the other set, said heat exchanger being mounted within said reservoir, a pump, said path for the flow of said medium, said reservoir, the inner set of said tubes and said pump forming a closed system for the circulation of said temperature regulating medium, and means to circulate a cooling medium through the outer set of said tubes.

6. In combination, a vapor electric device comprising a jacket providing a chamber for the circulation of a temperature regulating medium, a reservoir for said medium, a heat exchanger including two sets of tubes, the tubes of one of said sets being arranged respectively within the tubes of the other set, said heat exchanger being mounted within said reservoir, a pump mounted upon said reservoir, means comprising an expansion joint in the walls of said reservoir to compensate for unequal expansion of said tubes and said reservoir, said chamber, said reservoir, the inner set of said tubes and said pump forming a closed system for the circulation of said temperature regulating medium, and means to circulate a cooling medium through the outer set of said tubes.

7. In combination, a vapor electric device comprising means providing a path for the flow of a temperature regulating medium, a reservoir for said medium, a heat exchanger including two sets of tubes, the tubes of one of said sets being arranged respectively within the tubes of the other set, said heat exchanger being mounted within said reservoir, a pump, said path for the flow of said medium, said reservoir, the outer set of said tubes and said pump forming a closed system for the circulation of said temperature regulating medium, and means to circulate a cooling medium through the inner set of said tubes.

8. In combination, a vapor electric device comprising a jacket providing a chamber for the circulation of a temperature regulating medium, a reservoir for said medium, a heat exchanger including two sets of tubes, the tubes of one of said sets being arranged respectively within the tubes of the other set, said heat exchanger being mounted within said reservoir, a pump mounted upon said reservoir, means comprising an expansion joint in the walls of said reservoir to compensate for unequal expansion of said tubes and said reservoir, said chamber, said reservoir, the outer set of said tubes and said pump forming a closed system for the circulation of said temperature regulating medium, and means to circulate a cooling medium through the inner set of said tubes.

9. In combination, a vapor electric device comprising means providing a path for the flow of a temperature regulating medium, a reservoir for said medium, a heat exchanger including two sets of tubes, the tubes of one of said sets being arranged respectively within the tubes of the other set, said heat exchanger being mounted within said reservoir, a pump, said medium in the reservoir being at atmospheric pressure, said pump forcing said medium from the reservoir under pressure through said path and thereafter through the outer set of said tubes into said reservoir, and means to circulate a cooling medium through the inner set of said tubes.

10. In combination, a vapor electric device comprising means providing a path for the flow of a temperature regulating medium, a reservoir for said medium, a heat exchanger including two sets of tubes, the tubes of one of said sets being arranged respectively within the tubes of the other set, said heat exchanger being mounted within said reservoir, a pump to circulate said medium in series through said path and through the outer set of said tubes and said reservoir, the inner set of said tubes being connected at their upper ends to means providing for unequal expansion of said inner set of tubes and said reservoir, and means to circulate a cooling medium through said inner set of tubes.

ALBERT O. FLINDT.